United States Patent [19]

Kasubuchi

[11] Patent Number: 4,590,811

[45] Date of Patent: May 27, 1986

[54] REDUCTION STARTER

[75] Inventor: Fumiaki Kasubuchi, Katsuta, Japan

[73] Assignee: Hitachi, Ltd., Tokyo, Japan

[21] Appl. No.: 615,523

[22] Filed: May 31, 1984

[30] Foreign Application Priority Data

May 31, 1983 [JP] Japan .................................. 58-95035
Mar. 2, 1984 [JP] Japan .................................. 59-38860

[51] Int. Cl.[4] ......................... F02N 15/06; F16H 1/32

[52] U.S. Cl. ....................................... 74/7 E; 74/7 A; 74/801

[58] Field of Search ..................... 74/6, 7 R, 7 A, 7 C, 74/7 E, 801

[56] References Cited

U.S. PATENT DOCUMENTS

| | | | |
|---|---|---|---|
| 2,526,127 | 10/1950 | Gilbert | 74/7 C |
| 2,553,201 | 5/1951 | Metsger | 74/7 C |
| 2,868,040 | 1/1959 | Chamberlin | 74/801 |
| 3,081,648 | 3/1963 | Duer | 74/801 |
| 3,792,629 | 2/1974 | Applebury | 74/801 |
| 4,384,498 | 5/1983 | Eichinger | 74/801 |
| 4,494,414 | 1/1985 | Hamano | 74/7 E |
| 4,507,978 | 4/1985 | Tanaka et al. | 74/801 |

FOREIGN PATENT DOCUMENTS

| | | | |
|---|---|---|---|
| 2648151 | 5/1977 | Fed. Rep. of Germany | 74/801 |

*Primary Examiner*—Allan D. Herrmann
*Attorney, Agent, or Firm*—Antonelli, Terry & Wands

[57] ABSTRACT

A reduction starter employing a planetary gear type reduction gear mechanism having an outer sun gear displaceable in directions perpendicular to a common axis of a central sun gear and an output shaft carrying planet gears for revolution about the common axis. The outer sun gear is formed by an internally toothed ring gear elastically deformable to take up an offset, greater than a predetermined value, of any of the planet gears due to irregular mounting thereof, for thereby avoiding local or uneven contact between gear teeth and assuring a uniform distribution of load torque to all the planet gears.

7 Claims, 7 Drawing Figures

REDUCTION STARTER

BACKGROUND OF THE INVENTION

Field of the Invention

Starter having a reduction gear mechanism disposed between a starter motor shaft and a pinion and, more particularly, to a reduction starter in which the motor shaft and the shaft carrying the pinion are coaxially arranged.

A typical conventional starter for automotive engine has a pinion carried by the shaft of a starter motor which, when required, is adapted to be brought, when required, into engagement with a ring gear provided on the outer peripheral surface of a flywheel of the engine.

In recent years, a new type of starter called as "reduction starter" has been put into practical use in order to obtain a good starting performance. However, disadvantages of these proposed reduction starters reside in the fact that a reduction gear mechanism is constituted by spur gears and, thus, the motor shaft and the pinion shaft are not disposed coaxially but arranged parallel at a distance from each other. Consequently, the construction of the proposed starters, as a whole, is complicated resulting not only in an increase the size thereof but also in the manufacturing cost.

In order to eliminate the disadvantages of the conventional reduction starter attributable to the use of the spur gears, a reduction starter employing a planetary reduction gear mechanism has been proposed in, for example, the specification of British Pat. No. 964,675. In this type of reduction starter, it is possible to arrange the pinion shaft coaxially with the motor shaft, so that the size of the reduction gear mechanism can be reduced considerably. Consequently, the size of the reduction starter can be substantially as small as that of the conventional starter in which the pinion is connected directly to the motor shaft.

The reduction starter having the planetary gear type reduction mechanism, however, still suffers from the problem of high production cost due to a high precision required in the fabrication and assembling of the planetary gear type reduction gear mechanism. As is well known, any planetary gear mechanism is required to use a plurality of planet gears for attaining a good balance of mass and a high torque-transmitting performance. These planet gears have to be fabricated and mounted with a high precision in order to avoid local or uneven contact between gear teeth which would seriously lower the performance and durability of the gears. Accordingly, an object of the invention is to provide a reduction starter having a planetary gear type reduction gear mechanism improved to satisfy both of the demands for low cost and high performance to thereby overcome the above-described disadvantages of the prior art.

In accordance with advantageous features of the present invention a reduction starter is provided which employs a planetary gear type reduction mechanism having an outer ring gear displaceable, within a predetermined limit, in directions perpendicular to an axis common to a central sun gear and an output shaft which carries planet gears for rotation about the common axis.

The above and other objects, features and advantages of the invention will become clear from the following description with reference to the accompanying drawings.

DETAILED DESCRIPTION

Figure 1:
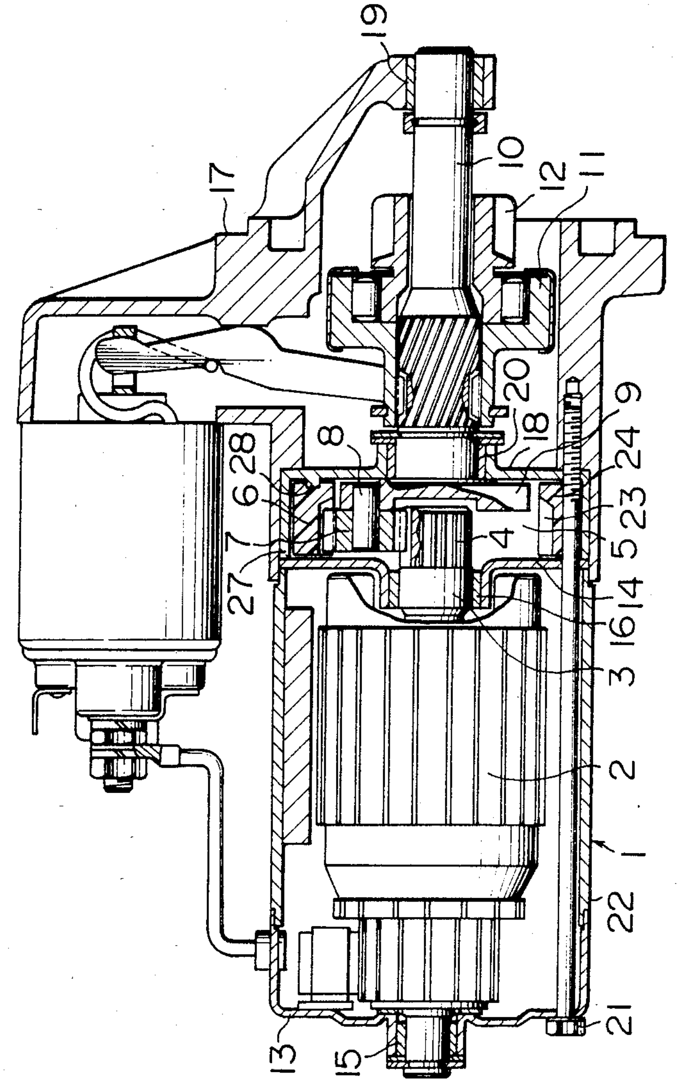
FIG. 1 is a partial axial sectional view of a reduction starter constructed in accordance with the invention.

Referring now to the drawings, wherein like reference numerals are used throughout the various views to designate like parts and, more particularly, to FIGS. 1 to 4, according to these figures reduction starter in accordance with the invention includes a starter motor 1 having an armature 2 carried by an armature shaft 3, with a pinion 4 being provided on one end of the armature shaft 3. The starter further includes an internally toothed ring gear 6 defining an annular space 5 therein, and a planetary gear type reduction gear mechanism including planet gears 7 carried by carrier pins 8 mounted on a planet carrier 9 perpendicularly thereto. A pinion shaft 10 is disposed coaxially with the armature shaft 3, with the pinion shaft 10 being surrounded by a roller clutch 11 and a pinion 12. The armature shaft 3 is supported at both ends by a rear cover 13 and a center bracket 14 through respective bearings 15, 16. A reference gear case 17 encases the reduction gear mechanism of the reduction starter, with a cup-shaped center bracket 18 being fixed at an outer peripheral surface thereof to the inner peripheral surface of the gear case 17. The center bracket 18 supports one end of the pinion shaft 10 through a bearing 20 while the other end of the pinion shaft 10 is supported by the gear case 17 through another bearing 19. The rear cover 13 is fixed to the gear case 17 by tie bolts 21 (only one of them is shown in FIG. 1) through the intermediary of a yoke 22. As will be best seen in FIG. 2, the ring gear 6 has an annular base 24 on the inner peripheral surface of which are formed a plurality of gear teeth 23. Recesses 25 are formed in one side or axial end surface of the annular base 24 while axial grooves 26, having a substantially U-shaped cross-section, are formed in the outer peripheral surface of the annular base 24. The cup-shaped center bracket 18 has a cylindrical portion 27 which is closed at its one end by an end wall which is provided on its inner surface (left surface as viewed in FIG. 3) with projections 28. Holes 29 are formed in the end wall of the cup-shaped center bracket 18. The other center bracket 14 is provided with holes 30 as will be seen in FIG. 4.

The armature shaft 3 carrying the armature 2 of the motor 1 is rotatably supported by bearings 15 and 16. The output torque of the motor is transmitted from the shaft 3 to the armature pinion 4 which is integral with the armature shaft 3.

The armature pinion 4 serves as a central sun gear of the planetary gear system while the internally-toothed ring gear 6 serves as an external or outer ring gear of the planetary gear mechanism. A plurality of planet gears 7 e.g., three, are disposed in the annular space 5 defined between the armature pinion 4 and the internally-toothed ring gear 6. The planet gears 7 are spaced equally in the circumferential direction and mesh with both of the central sun gear constituted by the armature pinion 4 and the external ring gear constituted by the internally-toothed ring gear 6. Thus, the armature pinion 4, the planet gears 7 and the internally-toothed ring gear 6 cooperate together to form a planet gear type reduction gear mechanism.

Each of the planet gears 7 is rotatably carried by an associated carrier pin 8 through an intermediary of, for example, a needle roller bearing. The carrier pins 8 are press-fitted into holes formed in respective arms of the planet carrier 9. The planet carrier 9 is formed integrally with the pinion shaft 10 which is supported rotatably by the gear cover 17 and the center bracket 18 through the bearings 19, 20. Consequently, each planet gear 7 rotates around its own axis on the associated carrier pin 8 while revolving around the axis of the pinion shaft 10.

Thus, when electric power is supplied to the starter motor 1, the armature 2 produces a torque to rotate the armature shaft 3. The torque is then transmitted to the pinion shaft 10 at a predetermined reduction ratio through the planetary gear type reduction gear mechanism formed by the armature pinion 4, planet gears 7 and the internally-toothed ring gear 6. Consequently, the pinion shaft 10 can be driven with a large torque.

The rotation of the pinion shaft 10 is transmitted to the pinion 12 through screw splines and the roller clutch 10 which operates as a one-way clutch. By operation of a solenoid, the pinion 12 is brought into engagement with a ring gear on a flywheel of an associated engine. Consequently, the output torque of the starter motor is transmitted to the engine to crank and start the same. The arrangement and operation for bringing the pinion 12 into engagement with the ring gear on the engine are identical to those of the conventional starters and, therefore, are not described in detail. The tie bolts 21 fasten the rear cover 13 and the yoke 22 to the gear case to complete the motor 1.

Figure 2:
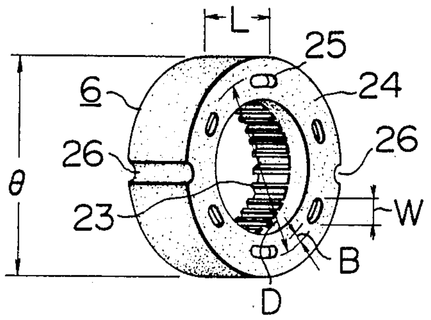
FIGS. 2, 3 and 4 are perspective views of respective component parts of the reduction starter shown in FIG. 1.

Referring to FIG. 2, the annular base 24 of the internally-toothed ring gear 6 is made of a suitable plastic material and has gear teeth 23 formed on the inner peripheral surface thereof. As described above, a plurality of recesses 25 are formed in one axial end surface of the internally-toothed ring gear 6. The U-shaped axial grooves 26 in the outer peripheral surface of the annular base 24 are provided to avoid interference between the tie bolts 21 and the internally-toothed ring gear 6.

Figure 3:
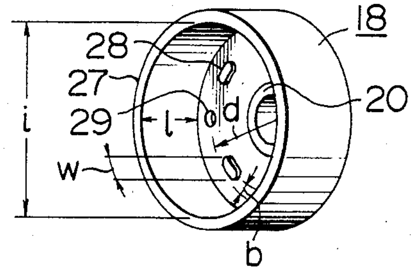
Figure 4:
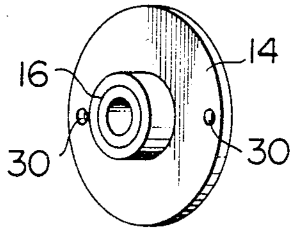

On the other hand, the center bracket 18 shown in FIG. 3 is cup-shaped and has the cylindrical portion 27. The projections 28, formed on the inner surface of the end wall of the bracket 18, are adapted to fit into the recesses 25 (see FIG. 2) on the internally-toothed ring gear 6 when the latter is received in the cylindrical portion 27 of the cup-shaped center bracket 18. The holes 29 formed in the end wall of the bracket 18 accommodate the tie bolts 21. As will be seen in FIG. 4, the other center bracket 14 is provided with bolt holes 30 around the bearing 16 for accommodating the tie bolts 21.

Referring again to FIG. 1, the internally-toothed ring gear 6 is received in the cylindrical portion 27 of the center bracket 18 with the recesses 25 snugly receiving the projections 28. The center bracket 18 with the other center bracket 14 disposed therein is received in a mounting spaced formed in the gear case 17 and is fixed to the gear case 17 by the tie bolts 21 which unite the rear cover 13, the yoke 22 and the gear case 17 together, as described above.

In the assembled state, the afore-mentioned annular space 5 is defined between the center bracket 18 and the center bracket 14. The internally-toothed ring gear 6 and the planet gears 7 are substantially hermetically housed in the annular space 5.

Referring to FIGS. 2 and 3, the outer diameter and the axial dimension of the annular base 24 of the internally-toothed ring gear 6 are represented by $\theta$ and L, respectively. The radial breadth and the circumferential width of each recess 25 are represented by B and W, respectively. A symbol D represents the diameter of a circle along which the outer sides of the recesses 25 are disposed. On the other hand, the axial depth and the inner diameter of the cylindrical portion 27 of the center bracket 18 are represented by l and i, respectively. The diameter of a circle along which the outer sides of the projections 28 are disposed is expressed by d. The circumferential width and the radial breadth of the projection 28 are represented by w and b, respectively. These dimensions are determined to meet the following conditions:

$\theta < i$ $L < l$ $D > d$ $W > w$ $B > b$

Examples of these items are:

| | | | |
|---|---|---|---|
| Θ = | 61 mm | i = | 62 mm |
| L = | 16.2 mm | l = | 16.4 mm |
| D = | 56.05 mm | d = | 55.95 mm |
| W = | 8.1 mm | w = | 7.9 mm |
| B = | 4.2 mm | b = | 3.8 mm |

It will be seen in the above comparison that the values of the dimensions D and d are relatively close to each other but the difference between the dimensions of each comparable pair of items is determined to be of a substantial value.

Therefore, when the gear 6 and the bracket 18 are assembled into the final state shown in FIG. 1, the radially outer surface of each projection 28 on the center bracket 18 closely fits to the radially outer surface of the associated recess 25 with an ordinary tolerance of fit. Other portions, however, are fitted together with comparatively large tolerance or play. In particular, a large clearance of 0.5 mm is left between the outer peripheral surface of the ring gear 6 and the inner peripheral surface of the bracket 18.

The operation of the described embodiment as well as the advantages of the described embodiment will be discussed hereunder:

As explained above, the local or uneven contact of gear teeth in the reduction gear mechanism is attributable, in many cases, to the lack of accuracy in the sizes of the parts. In the planetary gear type reduction gear mechanism having a plurality of, for example, three planet gears, as in the case of the described embodiment, however, the lack of uniformity in the dimensions of the parts as mounted is an important factor which adversely affects the meshing condition of the gears.

In the described embodiment, the internally-toothed ring gear 6 serving as the outer sun gear is mounted in the annular space 5 defined between the two center brackets 14, 18 with a sufficient dimensional margin for a certain degree of freedom of movement in this space 5. Therefore, even when there is a deviation of dimensions of the planet gears 7 as mounted from the correct dimensions, the deviation is permissible if it does not exceed the range given by the following formula:

$$(D-d)/2=(56.05-55.95)/2=0.05 \text{ mm}$$

Namely, if the amount of the deviation or offset does not exceed the above-mentioned value, the internally-toothed ring gear 6 is movable rather easily in response to the revolution of the planet gear 7 to eliminate any local or uneven contact between the gear teeth of the planet gears 7 and the gear teeth of the internally-threaded ring gear 6. Consequently, the three planet gears 7 can share substantially equal components of the load, i.e., the torque to be transmitted.

When the deviation of the dimensions of the planet gear 7, as mounted, exceeds the above-mentioned limit of 0.05 mm, the internally-toothed ring gear 6 can be elastically deformed within the difference between $\theta$ and i to prevent the local or uneven contact of the gear teeth to thereby assure uniform transmission of the load torque. In addition, since the ring gear 6 is not constrained at its outer peripheral surface but is freely displaceable, the above-mentioned elastic deformation of the ring gear 6 can take place not locally but all over the entire periphery of the ring gear 6, so that undesirable stress concentration which may lead to a breakdown of the ring gear can be avoided advantageously.

It will, therefore, be understood from the foregoing description that, according to the described embodiment, it is possible to obtain a reduction starter at a lower cost without impairing the performance because the undesirable local or uneven contact of the gear teeth can be avoided even if sufficient margins or tolerances are allowed for the fabrication and mounting of the parts.

In the described embodiment, the recesses 25 and the projections 28 cooperate to prevent the internally-toothed ring gear 6 from rotating relative to the center bracket 18. The use of the recesses 25 and the projections 28 contributes to easiness of fabrication and assembling and thus to reduction in the cost. This, however, is not exclusive and equivalent measures such as combination of pins or bolts and holes may be used in place of the combination of the recesses 25 and the projections 28.

In the described embodiment, the annular space 5 defined between the two center brackets 14 and 18 and accommodating the planetary gear type reduction gear mechanism may contain a suitable lubricant such as grease to lubricate the rotatable parts in this space. By so doing, it is possible to attain higher performance of the reduction gear mechanism and, hence, of the reduction starter as a whole.

It is possible to increase the clearance between the pinion shaft 10 and the bearing 20 to some extent. Such an increased clearance will contribute to the elimination of any local or uneven contact between the gear teeth of the planet gears 7 mounted and the gear teeth of the armature pinion 4 even if the dimensions of the planet gears 7, as mounted, are deviated from the correct or predetermined dimensions.

Figure 5:
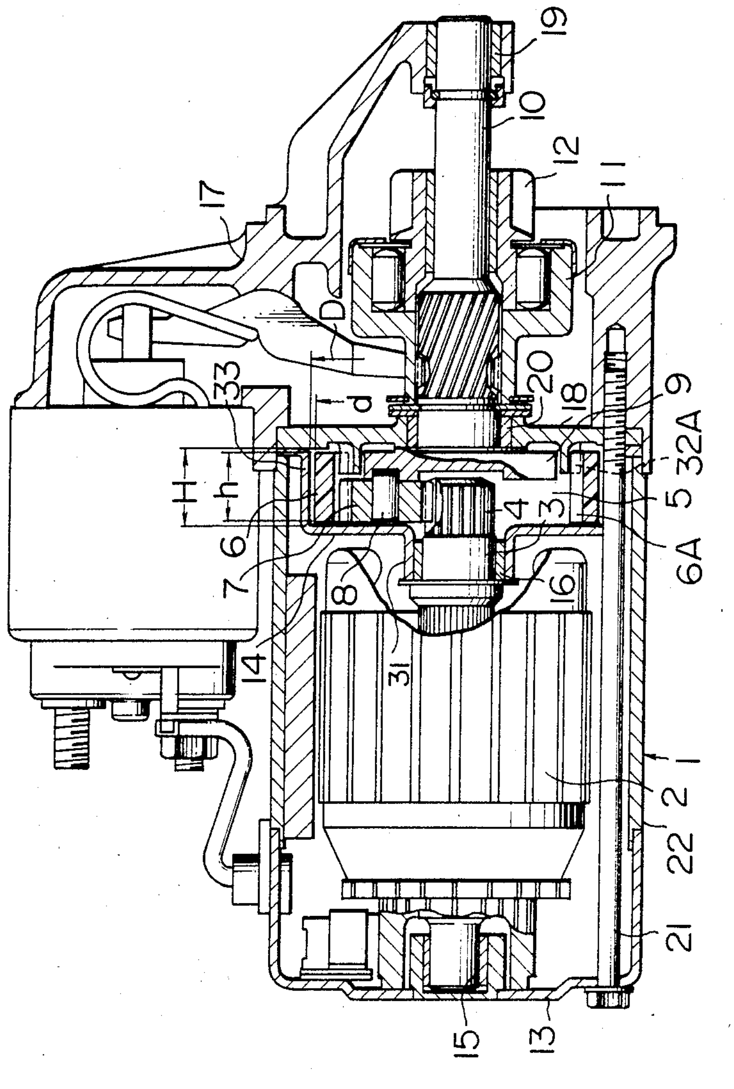
FIG. 5 is a partial axial sectional view of another reduction starter constructed in accordance with the invention.
Figure 6:
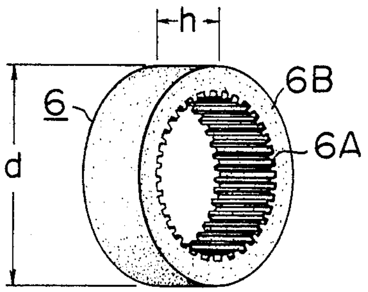
FIGS. 6 and 7 are perspective views of respective component parts of the reduction starter shown in FIG. 5.
Figure 7:
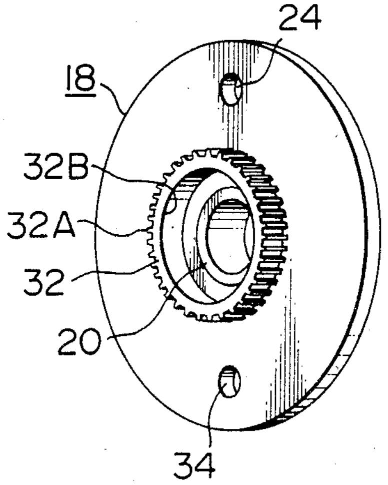

In FIGS. 5 to 7, the center bracket 14, adjacent to the armature, has a generally cup-like shape and is fixed at its outer periphery between the yoke 22 and the gear case 17. An inner or central cylindrical portion 31 of the center bracket 14 holds a bearing 16 which, in turn, supports the armature shaft 3.

On the other hand, the center bracket 18, adjacent to the pinion, has a disk-like shape and is fixed at its outer periphery by being clamped together with the outer periphery of the cup-shaped center bracket 14. As will be seen in FIG. 7, the center bracket 18 is provided on one side thereof with a central ring gear 32 having gear teeth 32A on the outer periphery thereof. On the other hand, as shown in FIG. 6, the internally-toothed ring gear 6 is provided with axially extending gear teeth 6A. These gear teeth 6A mesh at their one ends with the gear teeth 32A of the gear 32 over the entire periphery of the latter, while the other axial end portions of the gear teeth 6A mesh with the planet gears 7.

More specifically, the center bracket 14, adjacent to the armature, is made from, for example, an iron sheet which is formed by a press into the cup-like shape having the central or first cylindrical section 31 for receiving the bearing 16 and an outer or second cylindrical section 33 for receiving the internally-toothed ring gear 6. The axial dimension H and the inner diameter D of this second cylindrical section 33 are determined in relation to the axial length h and the outer diameter d of the cylindrical ring gear 6 such that a slight gap of 0.2 mm or so is left between these members in axial and radial directions.

As shown in FIG. 6, the cylindrical ring gear 6 is formed as a cylindrical member 6B having gear teeth 6A formed on the inner peripheral surface thereof. The cylindrical ring gear 6 may be formed either by cold working of steel, aluminum or the like metal or by moulding a plastic material. Namely, as will be explained later, the ring gear 6 is not necessarily required to be formed from a steel but may be molded from a plastic material. The cylindrical ring gear 6 of this embodiment has a symmetrical form and, therefore, can be fabricated easily. In addition, it can be mounted automatically because the detection of position thereof is unnecessary during the mounting.

The center bracket 18 adjacent to the pinion is form by cold working or precision casting into the annular shape 32 having gear teeth 32A projecting from one side thereof, as will be seen in FIG. 7. The number of gear teeth 32A of the gear 32 is selected to be equal to the number of the gear teeth 6A of the cylindrical ring gear 6 so that these gears mesh each other with a suitable tolerance or back-lash in the order of 1/10 of the module. The arrangement is such that, as shown in FIG. 5, the planet carrier 9 is accommodated by the cavity in the gear 32 while the aforementioned bearing 20 is press-fitted into the central bore of the center bracket 18. The center bracket 18 has holes 34 for the tie bolts 21 so that the center bracket 18 is prevented from rotating around its own axis.

Thus, in this embodiment of the reduction starter, the center bracket 18, adjacent to the pinion, and the cylindrical ring gear 6 are fabricated separately. In addition, these members are not rigidly connected to each other but are held by each other against rotation through the meshing engagement between the gear teeth 32A of the bracket 18 and the internal gear teeth 6A of the cylindrical ring gear 6. Consequently, the cylindrical gear 6 is allowed to have a uniform elastic deformation to some extent.

Namely, in this embodiment, the ring gear 6 with its gear teeth 6A rather loosely meshing with the gear teeth 32A of the center bracket 18 is placed in a comparatively loose manner within the annular space 5 formed between the center brackets 14, 18. Therefore, even if there is a somewhat large offset of one of the planet gears 7 from the correct mounting position, the internally toothed ring gear 6 can easily be displaced radially in response to the revolution of this planet gear 7 to absorb the offset of the planet gear 7, thereby attaining a uniform distribution of the load torque to all planet gears 7. In the case where the amount of the offset of the planet gear 7 is greater, the uniform distribution of the load torque would not be achieved solely by the radial displacement of the ring gear 6. In this case, such a larger offset of a planet gear can be taken up by a comparatively large elastic deformation of the ring gear 6. Namely, since the cylindrical portion 6B of the internally-toothed ring gear 6 has a uniform cross-section, the ring gear 6 can make an elastic deformation over its entirety, so that the stress caused in the internally-toothed ring gear 6 can be distributed evenly so that no local stress concentration takes place in the internally-toothed ring gear 6. It is, therefore, possible to produce the ring gear 6 from a material such as a plastic material which is not as strong as steel. It will be seen that the elastic deformation of the entirety of the ring gear 6 effectively absorbs the offset of the planet gear 7 to avoid any local or uneven contact between the gear teeth of the planet gears 7 and the gear teeth of the ring gear 6 thereby assuring a uniform distribution of the load torque to all planet gears and, hence, a highly smooth and efficient transmission of the torque.

What is claimed is:

1. A reduction starter including a starter motor having an armature shaft, a reduction gear mechanism having a sun gear fixed to an end of said armature shaft and an output shaft disposed coaxially with said sun gear, a pinion gear carried by said output shaft and a center bracket rotatably supporting said output shaft, wherein said reduction gear mechanism is formed by a planetary gear mechanism comprising an input shaft formed by the shaft of said sun gear, planet gears mounted for revolution about the axis of said sun gear and drivingly connected to said output shaft, and an outer ring gear mounted for displacement within a limited range in directions substantially perpendicular to the common axis of said input and output shafts, said outer ring gear is provided with recesses formed in one end face of said outer ring gear, and said center bracket is provided with projections engaged with said recesses to hold said outer ring gear against rotation, and said center bracket has a generally cup-like shape having an inner diameter approximately equal to the outer diameter of said outer ring gear and said bracket accommodates said outer ring gear.

2. A reduction starter according to claim 1, wherein said outer ring gear comprises an internally toothed annular member.

3. A reduction starter according to claim 2, wherein said annular member is made of a plastic material.

4. A reduction starter according to claim 1, wherein said outer ring gear has an outer diameter $\theta$ and an axial dimension L, said center bracket has a substantially cylindrical inner peripheral surface having an inner diameter i and an axial dimension l, each of said recesses has a radial dimension B and a circumferential dimension W, said recesses have outer sides disposed along a circle of a diameter D, each of said projections has a radial dimension b and a circumferential dimension w, said projections have outer sides disposed along a circle of a diameter d, and said dimensions are determined to meet the following conditions: $\theta < i$, $L < l$, $D > d$, $W > w$, $B > b$.

5. A reduction starter including a starter motor having an armature shaft and a reduction gear mechanism having a sun gear fixed to an end of said armature shaft and an output shaft disposed coaxially with said sun gear, a pinion carried by said output shaft and a center bracket rotatably supporting said output shaft, said reduction gear mechanism is formed by a planetary gear mechanism comprising an input shaft formed by the shaft of said sun gear, planet gears mounted for revolution about the axis of said sun gear, and drivingly connected to said output shaft, and an outer ring gear mounted for displacement within a limited range and direction substantially perpendicular to the common axis of said input and output shafts, and wherein said center bracket has an annular gear formed on and projecting from one side of said bracket and said outer ring gear is formed thereon with axially extending gear teeth in meshing engagement with said annular gear.

6. A reduction starter according to claim 5, wherein said outer sun gear comprises a cylindrical member.

7. A reduction starter including a starter motor having an armature shaft, a reduction gear mechanism having a sun gear fixed to an end of said armature shaft, and an output shaft disposed coaxially with said sun gear, a generally cup-shaped first center bracket rotatably supporting said input shaft and a second center bracket rotatably supporting said output shaft, said reduction gear mechanism is formed by a planetary gear mechanism comprising an input shaft formed by the shaft of said sun gear, planet gears mounted for revolution about the axis of said sun gear and drivingly connected to said output shaft, and an outer ring gear mounted for displacement within a limited range in directions substantially perpendicular to the common axis of said input and output shafts, and wherein said outer ring gear is formed thereon with axially extending gear teeth, said second center bracket is an annular gear formed on and projecting from one side of said second bracket, said axially extending gear teeth of said outer bracket ring gear being in meshing engagement with said annular gear, said outer ring gear being supported at its outer periphery by said first center bracket.

* * * * *